April 6, 1926.
S. C. LAVENDER
HOSE CLAMP
Filed Dec. 3, 1925
1,579,719
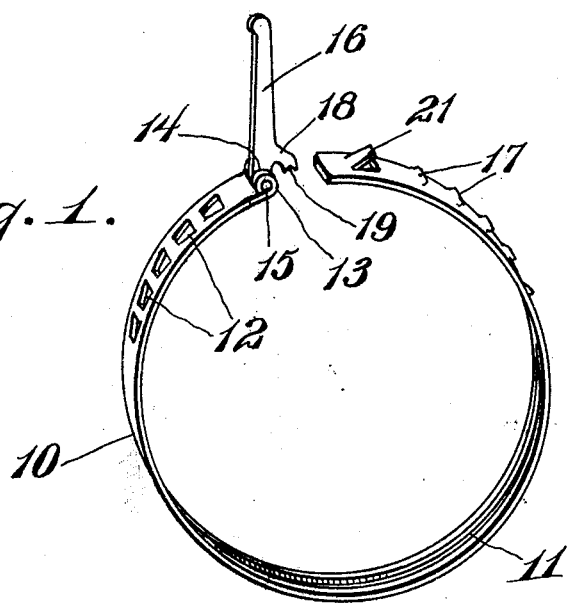
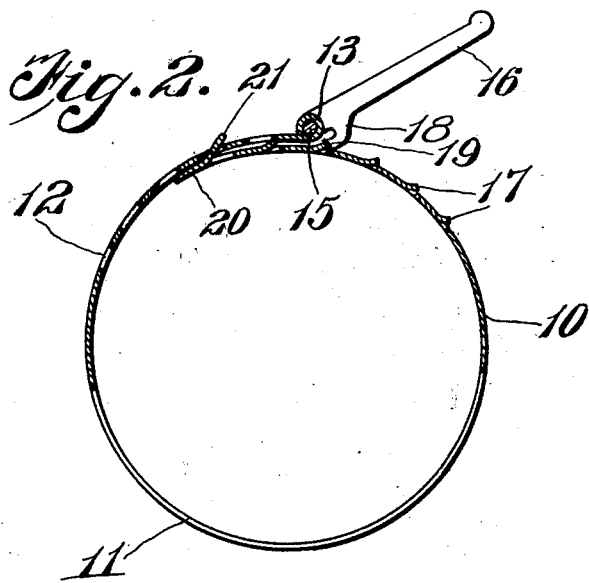
Inventor
Samuel C. Lavender
By Watson E. Coleman
Attorney Patented Apr. 6, 1926.

1,579,719

UNITED STATES PATENT OFFICE.

SAMUEL C. LAVENDER, OF SLIM, OKLAHOMA, ASSIGNOR OF ONE-FOURTH TO ROBERT W. CASE, OF WRIGHT CITY, OKLAHOMA.

HOSE CLAMP.

Application filed December 3, 1925. Serial No. 73,005.

*To all whom it may concern:*

Be it known that I, SAMUEL C. LAVENDER, a citizen of the United States, residing at Slim, in the county of McCurtain and State of Oklahoma, have invented certain new and useful Improvements in Hose Clamps, of which the following is a specification, reference being had to the accompanying drawings.

This invention relates to hose clamps and more particularly to a hose clamp embodying a lever whereby it may be tightened to clamp the hose.

An important object of the invention is to provide an improved form of lever as well as an improved clamp having portions with which the lever coacts to cause tightening of the clamp.

These and other objects I attain by the construction shown in the accompanying drawing, wherein for the purpose of illustration is shown a preferred embodiment of my invention and wherein:—

Figure 1 is a perspective view of a hose clamp constructed in accordance with my invention;

Figure 2 is a vertical sectional view therethrough.

Referring now more particularly to the drawing, the numeral 10 indicates a metal band, the major portion of the body of which is slotted, as indicated at 11, so that the body of the hose may bulge therethrough to prevent slipping of the clamp upon the hose. This slot terminates short of the ends of the band and one end of the band is formed with a longitudinally extending series of openings 12 and at this extremity is formed with an eye 13 which is centrally notched, as at 14. Through the sections of the eye thus produced, a pivot pin 15 is directed and passes through a lever 16 which is disposed in the notch 14.

The opposite end of the band has struck-up therefrom a plurality of shoulders 17, each formed by slitting the metal of the band transversely and pressing the metal at one side of the band upwardly, as shown. Thus teeth are formed, the walls of which are spaced vertically from the band and arranged at the outer face of the band. The working end 18 of the lever is hooked, as shown, and is formed in its end with a notch 19 adapted to receive the metal at the edge of the projections or teeth 17. The teeth 17 are spaced similarly to the openings 12.

In the use of the band, the band is first placed about the hose with the extremity 20 of the last named end portion arranged beneath the end portion having the openings 12. This extremity is provided with a hook 21 inclining away from the free end of the extremity and this hook is engaged in one of the openings 12. To tighten the band, the lever then has its working end brought into engagement with one of the projections 17, the notch 19 receiving the end wall of the projection after which the lever is forced in the direction of the arrow on Figure 2 with the result that the band is constricted and the extremity 20 and end portion bearing the openings 12 caused to have movement in opposite directions. This will cause the hook to slide out of the opening with which it is engaged and align with a second opening through which it will pass because of the tendency of these sections to remain in engagement, one being forced outwardly by the resiliency of the hose while the other is drawn inwardly by the strain placed thereon by the lever. This operation is continued until the band is sufficiently tightened.

It will be obvious that a device of this character may be very readily and cheaply produced and is very readily applied to the hose without the use of tools of any sort. It will also be obvious that the construction hereinbefore set forth is capable of a certain range of change and modification without materially departing from the spirit of the invention and I accordingly do not limit myself to such specific structure except as hereinafter claimed.

I claim:—

1. A hose clamp comprising a band having formed in one end thereof a longitudinally extending series of openings, the extremity of said end having pivoted thereto a lever swingable in a plane including the longitudinal axis of the band and a plurality of teeth formed upon the outer surface of the opposite end of the band with which one end of the lever is adapted to engage, the extremity of the last named end of the band having a hook adapted for engagement in the openings of the first named end of the band to prevent return movement of the last named end of the band after shifting thereof by said lever.

2. A hose clamp comprising a band having formed in one end thereof a longitudinally extending series of openings, the extremity of said end having pivoted thereto a lever swingable in a plane including the longitudinal axis of the band and a plurality of teeth formed upon the outer surface of the opposite end of the band with which one end of the lever is adapted to engage, the extremity of the last named end of the band having a hook adapted for engagement in the openings of the first named end of the band to prevent return movement of the last named end of the band after shifting thereof by said lever, said end of said lever having a notch, each of said teeth having a relatively thin wall adapted for engagement with the notch and spaced from the outer face of the band.

In testimony whereof I hereunto affix my signature.

SAMUEL C. LAVENDER.